(12) United States Patent
Keshavaraj (10) Patent No.: US 7,014,914 B2
(45) Date of Patent: Mar. 21, 2006

(54) POLYESTER YARN AND AIRBAGS EMPLOYING CERTAIN POLYESTER YARN

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 161 days.

(21) Appl. No.: 10/755,121

(22) Filed: Jan. 9, 2004

(65) Prior Publication Data

US 2005/0153609 A1    Jul. 14, 2005

(51) Int. Cl.
*D01F 6/00* (2006.01)
*B60R 21/16* (2006.01)

(52) U.S. Cl. .................... 428/364; 280/743.1
(58) Field of Classification Search ............ 428/364; 280/743.1
See application file for complete search history.

(56) References Cited

U.S. PATENT DOCUMENTS

| | | | |
|---|---|---|---|
| 3,776,882 A | 12/1973 | Witzler et al. | 260/45.9 |
| 3,919,383 A * | 11/1975 | Yankowsky | 156/244.11 |
| 4,016,142 A * | 4/1977 | Alexander et al. | 525/437 |
| 4,164,114 A * | 8/1979 | Yabuki et al. | 57/236 |
| 4,442,058 A * | 4/1984 | Griffith et al. | 264/141 |
| 4,722,203 A | 2/1988 | Darjee | 66/202 |
| 4,827,999 A | 5/1989 | Yabuki et al. | 152/451 |
| 5,153,164 A | 10/1992 | Mason | 502/324 |
| 5,182,359 A | 1/1993 | Kanaka et al. | 528/193 |
| 5,236,775 A | 8/1993 | Swoboda et al. | 428/225 |
| 5,277,858 A | 1/1994 | Neal | 264/210.8 |
| 5,296,278 A | 3/1994 | Nishimura et al. | 428/36.1 |
| 5,470,106 A | 11/1995 | Nishimura et al. | 280/743.1 |
| 5,637,114 A | 6/1997 | Hohnke | 8/137 |
| 5,811,508 A * | 9/1998 | Zeitler et al. | 528/176 |
| 5,863,644 A | 1/1999 | Bonigk et al. | 428/221 |
| 5,902,672 A | 5/1999 | Swoboda et al. | 428/258 |
| 6,015,616 A | 1/2000 | Simons et al. | 428/364 |
| 6,248,418 B1 | 6/2001 | Taguchi et al. | 428/85 |
| 6,294,487 B1 | 9/2001 | Keshavaraj | 442/218 |
| 6,342,578 B1 * | 1/2002 | Huang | 528/271 |
| 6,403,006 B1 | 6/2002 | Nelson et al. | 264/210.8 |
| 6,767,485 B1 * | 7/2004 | Steiner | 264/40.1 |

FOREIGN PATENT DOCUMENTS

EP    0 607 798    7/1994

(Continued)

OTHER PUBLICATIONS

Article from internet; Hyosung Textile; Dec. 24, 2003.

(Continued)

*Primary Examiner*—N. Edwards
(74) *Attorney, Agent, or Firm*—Terry T. Moyer; Sara M. Current (57) ABSTRACT

Airbag cushions manufactured from polyester yarn having certain levels of intrinsic viscosity (IV) and certain specific carboxyl end group ("CEG") levels perform unexpectedly well in high temperature and high humidity environments for airbag cushion applications. This specification identifies certain polyester yarns and characteristics of such polyester yarns that are necessary to achieve unexpectedly good performance in such high humidity and high temperature applications. A polymeric polyester yarn for airbags, said yarn having a high degree of tenacity even after a long period of exposure to high temperature and high humidity conditions is disclosed. In one aspect of the invention, a polyester yarn having CEG of less than about 60 equivalents/$10^6$ gram, and more preferably less than about 30 equivalents/$10^6$ grams, is particularly useful. In another embodiment, a polyester yarn having an IV value of at least about 0.6 performs exhibits superior properties.

23 Claims, 3 Drawing Sheets

FOREIGN PATENT DOCUMENTS

| | | |
|---|---|---|
| JP | 05 214632 | 8/1993 |
| JP | 6-270857 | 9/1994 |
| JP | 6-270858 | 9/1994 |
| JP | 8-134716 | 5/1996 |
| JP | 8/134717 | 5/1996 |
| JP | 11-95218 | 4/1999 |
| JP | 2000-290835 | 10/2000 |
| WO | 03/010370 | 2/2003 |

OTHER PUBLICATIONS

International Standard; ISO 2114:2000(E) Plastics (polyester resins) and paints and varnishes (binders)—Determination of partial acid value and total acid value.

Commonly Owned U.S. Appl. No. 10/041,376; filed Jan. 8, 2002; Entitled: 'Airbag made from low tenacity yarns' (Milliken File No. 5287) (copy enclosed).

* cited by examiner

POLYESTER YARN AND AIRBAGS EMPLOYING CERTAIN POLYESTER YARN

BACKGROUND OF THE INVENTION

Stabilized nylon 6,6 yarn has been used for some time as a preferred yarn for automotive airbag cushion applications. Relatively high strength nylon yarns having a tenacity above 8.0 grams/denier are commonly used in automotive airbag applications.

Nylon 6,6 yarn when stabilized generally performs well in aging tests. Airbags must pass aging tests to be employed by automotive manufacturers. Manufacturers provide relatively strict requirements for the strength performance of airbags after such airbags have endured significant amounts of aging at high temperatures and high humidity. Automobiles are exposed to high temperatures and high humidity for many years, and thus airbags within deployment modules installed in automobiles also must retain their strength so that when and if airbag deployment occurs, the airbag will be capable of operating properly.

In the past, it has been relatively rare that manufacturers have employed polyester yarn for automotive airbag applications. One reason is that polyester tends to deteriorate over time at high temperature and high humidity. Thus, polyester has not been a favorite candidate yarn for airbags in part because of inadequate performance in humidity aging tests.

It is known that the tenacity of polyester can be increased in some instances by further drawing the polyester. Tenacity is also known as tensile strength. Tenacity is one measure of the strength of polyester yarn. One drawback to further drawing polyester yarn to achieve high levels of tenacity relates to the excessive costs associated with drawing processes in such manufacture.

In the recent past there has been no cost advantage in the use of polyester yarn having a tenacity of about 8–9 as compared to conventional stabilized nylon 6,6 yarn which is in widespread use for airbag applications. Conventional polyester yarns available for airbag applications still sometimes fail to pass the relatively strict automotive industry requirements for long term strength after such "hydrolytic" aging.

Current industrial applications for polyester usually do not require that the polyester yarn withstand relatively high temperatures and high humidity while still maintaining a relatively high tensile strength for a long period of time. Thus, there is no ready information at hand in the prior art that identifies what polyester yarn types could be suitable for airbag use.

Polyester chemistry is a highly unpredictable art. The task of finding or formulating a polyester yarn that will perform in airbag applications in an extremely difficult task, and often requires a significant expenditure of research effort and time.

Airbag applications, in contrast to other typical polyester end use applications, typically require that a yarn maintain at least at about 85% of its strength after several thousand hours of exposure to relatively high humidity and high temperature environments. Most polyesters that are known in the industry cannot meet such requirements. It would therefore be desirable to discover, identify, characterize, and establish both physical and chemical characteristics of what products and processes will provide a polyester yarn that will pass stringent testing requirements for airbag applications.

In general, the airbag manufacturing industry needs reliable and effective alternatives to the use of nylon 6,6 for airbag applications. A lower cost alternative to nylon 6,6 would be desirable. Furthermore, the discovery of a manner or a method for manufacturing, measuring, evaluating or applying polyester yarn in a manner that will pass strict automotive testing requirements would be helpful. The identification and measurement of both physical and chemical properties in the polyester yarn that undesirably lead to deterioration of the yarn would be helpful. Once these properties have been identified and correlated to airbag testing requirements, it may be possible to identify materials for airbag applications.

A currently pending, commonly owned and published U.S. patent application Ser. No. 10/041,376 and titled "Airbag Made from Low Tenacity Yarns" (Milliken file number 5287) published on Jan. 8, 2002. This publication reveals that in certain specific applications airbag systems may be designed in which a yarn having a tenacity of less than about 8.0 grams per denier can be employed in some applications. This disclosure specifically advises placing the seams of the airbag in shear to achieve this effect. Structural modifications are made to the airbag to achieve a satisfactory configuration.

BRIEF DESCRIPTION OF THE DRAWINGS

FIG. 1 shows the tensile strength changes upon hydrolytic aging at 80° C. and 95% RH of commercially available 650 denier polyester high tenacity yarn currently available from KoSa (designated in FIG. 1 as "PET 1") and 650 denier polyester high tenacity yarn currently available from Honeywell Corporation (designated in FIG. 1 as "PET 2");

FIG. 2 is a graph showing the Intrinsic Viscosity ("IV") changes upon hydrolytic aging (heat and moisture) at 80° C. and 95% RH for the yarn types mentioned above with reference to FIG. 1;

FIG. 3 reveals the carboxyl end groups ("CEG" or "CEG's") changes upon hydrolytic aging at 80° C. and 95% RH in micro-equivalents per gram (equivalents/$10^6$ gram) at various levels of exposure time for the polyester yarn types previously identified for FIGS. 1–2;

FIG. 4 illustrates a polyester yarn which may be employed in the practice of the invention, which provides minimal loss in tensile strength over time in high temperature and high humidity conditions (80° C. and 95% RH);

FIG. 5 illustrates the hydrolytic aging performance of the polyester yarn of FIG. 4 of the invention, showing CEG end group levels after given levels of aging exposure at 80° C. and 95% RH.

PERFORMANCE AND TECHNICAL CHARACTERISTICS OF CURRENTLY AVAILABLE AIRBAG POLYESTER YARNS

The performance of known polyester yarns currently commercially offered for airbag use in high temperature and high humidity environments (85° C. and 95% relative humidity) have been found to be generally undesirable after several thousand hours of exposure at 80° C. and 95% RH. In general, polyester performs in a manner that is inferior to nylon 6,6 in prolonged exposure environments (i.e. at greater than about 1000 hours exposure). Thus, polyester yarns available currently provided in the industry for use in airbags lose more than about 37% strength when exposed to 85° C. and 95% relative humidity for about 3000 hours. This level of strength loss is unacceptable for typical airbag applications, and does not meet industry testing requirements.

Turning now to the Figures, inventive work was undertaken to study the mechanism of airbag polyester yarn degradation, in an attempt to identify and characterize what features of polyester can be measured that are relevant to the propensity of polyester yarn to degrade.

Figure 1:
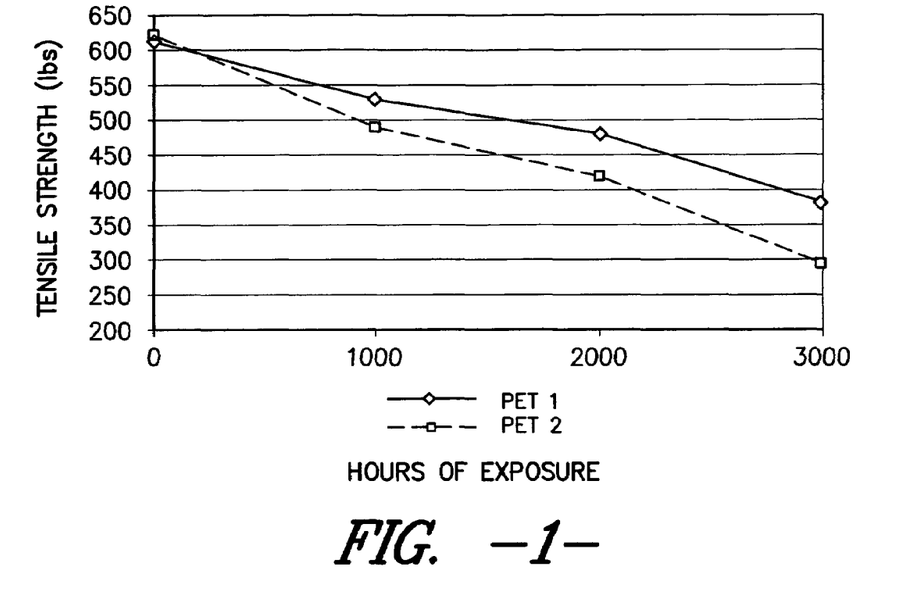
FIGS. 1–3 show hydrolytic aging results for prior art polyester yarns.
Figure 2:
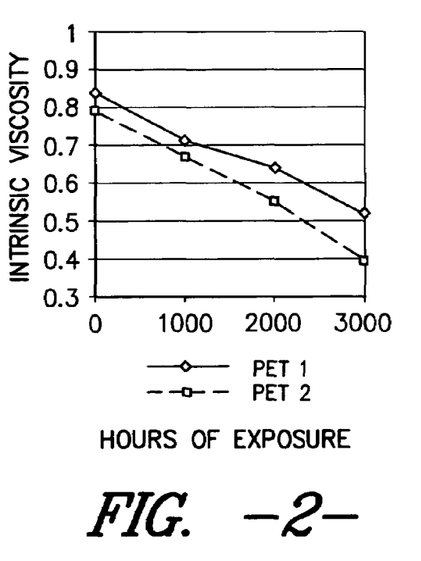
Figure 3:
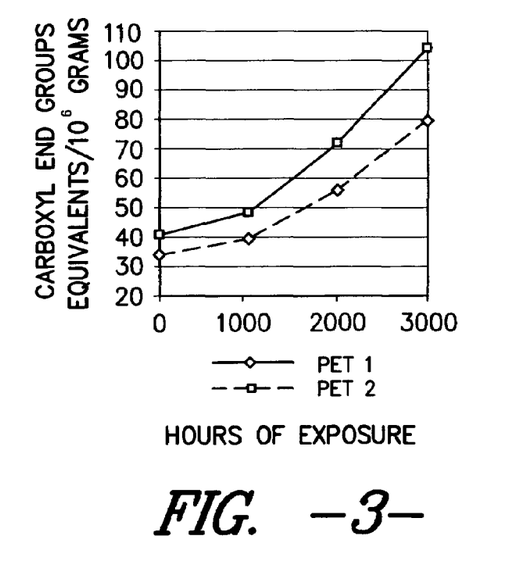

Commercially available 650 denier polyester from KoSa Company and Honeywell Corporation were evaluated. In the FIGS. 1–3, "PET 1" denotes KoSa brand 650 denier polyester high tenacity yarn. In FIGS. 1–3, "PET 2" denotes Honeywell high tenacity polyester yarn, offered commercially in the industry for airbags. FIG. 1 shows the aging behavior of two prior art yarns in the fabric form which were woven in a water-jet loom at a construction of 41×41.

As shown in FIG. 1, the slope of the curve changes rather dramatically (and undesirably) with exposure time. The first portion of the tensile strength drop for a given amount of exposure time is usually a gradual process that becomes more accelerated as exposure time increases. The accelerated aging is believed to be catalyzed by the carboxyl end groups. A large extent of tensile strength loss was observed in these particular KoSa and Honeywell polyester yarns. This strength loss is highly undesirable for airbag applications.

One objective in formulating and identifying polyester yarns of the invention is to find a polyester yarn type that will not suffer such an undesirable loss in tensile strength following aging. Surprisingly, such yarn types have been discovered and characterized, as further set forth below. Furthermore, it is a goal to identify what physical and chemical values of the many which can be measured will reliably predict polyester yarn aging behavior and the resultant loss in tensile strength.

Characterization of Polyester by Measuring Intrinsic Viscosity (IV) and Carboxyl End Groups (CEG)

The intrinsic viscosity (molecular weight) changes in FIGS. 2–3, and the percentage drop for these samples correspond with changes observed in tensile strength. The drop in intrinsic viscosity (IV) seems to accelerate (i.e. become reduced) much faster after a certain time of exposure. The carboxyl end group (CEG) on the control specimens was measured at 34.3 and 41 equivalents/$10^6$ grams for PET1 and PET2 respectively. The CEG increased steadily upon exposure and at the end of 3000 hrs the concentration rises as high as 79.3 and 104 m.eq/gm for both polyesters. At this point a considerable loss in the tensile strength occurs, and airbags manufactured from these yarn types show considerable loss in burst pressure. Thus, they are not fit for use. The increase in the slope of the tensile strength and IV is believed to be due in part to auto-catalyzation or further breakdown of ester linkages in the polyester. Based on this study it is believed that when the CEG concentration goes beyond about 60 equivalents/$10^6$ gm the fabric is no longer fit for use.

FIG. 3 reveals a CEG value of at least about 80 equivalents/$10^6$ grams for PET2, and a CEG value of over 100 for PET1. This may be contrasted with data generated using a yarn of the invention, as further shown in FIG. 5, for example, as further discussed below.

For the airbag use, the yarn from which the bag is constructed must not lose more than about 10% of the original strength upon aging after 1000 hours. Based upon the data in FIG. 1, it is relatively that clear the hydrolytic resistance of this particular polyester at high temperatures and longer exposure time is detrimental.

DETAILED DESCRIPTION OF THE INVENTION

Surprisingly, it has been found that polyester yarn having certain levels of intrinsic viscosity (IV) and certain specific carboxyl end group ("CEG") levels perform unexpectedly well in high temperature and high humidity environments for airbag applications. Such polyester may be woven to make an airbag exhibiting superior aging characteristics. Polyester yarns types that never have been employed previously for airbag applications now have been found to be capable of performing in such applications, if chosen specifically for chemical properties that are found to be important to aging. This specification identifies certain polyester yarns and characteristics of such polyester yarns that are necessary to achieve relatively unexpectedly good performance in such high humidity and high temperature applications. Properties that are important include both CEG values and IV values.

It has been found in the practice of the invention that undesirable loss of polyester strength occurs when the polymer backbone of the polyester chain undergoes a scission mechanism where by the chain length of the polymer is reduced considerably. This is highly undesirable.

Based upon an understanding of the chemical structure of polyester, as shown below:

[—OC—<O>—COOCH$_2$CH$_2$O—]$_n$ it has been discovered that there is a direct link between the structure of the polyester backbone and the reduction in polyester strength following high temperature or high humidity conditions. This is a significant discovery, and the discovery of this fact has led to the characterization of polyester types that will perform well for airbags, and is a subject of this invention.

The weakest link in the backbone of the polyester molecule is the ester linkage (O=C—O). Hence, the ester linkage is believed to be the only portion of the polyester molecule that is susceptible to attack in a high humidity and high temperature environment. Thus, control polyester yarn which has a reduced level of CEG is highly desirable, and these yarn types are the most useful in the practice of the invention.

Further, changes in the backbone of the polyester polymer may be monitored and evaluated. The intrinsic viscosity ("IV") changes of the yarn or polymer may be measured to obtain an indication of the molecular weight that should decrease as the chain length is reduced. Furthermore, the CEG separation may be measured to obtain an indication of the degree of undesirable backbone scission (breakage) which has occurred. The extent of the increase in this CEG is a significant issue in the performance of a polyester.

Polyester Yarns Having Certain IV and CEG Levels Have Been Found Desirable for Airbags In the invention, it has been found that evaluating IV and CEG of polyester yarns is very important in determining which yarns will perform adequately in hydrolytic aging, and which yarns will not so perform. Further, the values of IV and CEG which are found to be necessary for airbag applications have been observed, as reported herein. Such chemical characteristics typically have not been specified or identified for airbag use before this invention. That is, in general, only physical characteristics (like yarn tenacities, elongation, shrinkage, etc.,) have been relied upon for the yarn specifications prior to the invention of this application. Furthermore, the addition of chemical inhibitors and end-group capping agents have been found to improve resistance to aging, in the practice of the invention.

A new airbag has been invented, which may be realized in several different embodiments, described herein. The airbag may be comprised in part of woven polymeric polyester yarn, said polyester yarn exhibiting superior hydrolytic resistance, said yarn being capable of characterization by a carboxyl end group (CEG) value, wherein said yarn provides a CEG value of less than about 30 equivalents/$10^6$ grams after said yarn is exposed for at least about 336 hours to a temperature of at least about 85 degrees Centigrade and a relative humidity of at least about 95 percent. The time period of 336 hours is the time period specified in ASTM D5427, further described herein.

Furthermore, an airbag has been invented in which the airbag is comprised in part of polyester yarn exhibiting a CEG value of less than about 60 equivalents/$10^6$ grams after said yarn is exposed for at least about 3000 hours to a temperature of at least about 85 degrees Centigrade and a relative humidity of at least about 95 percent, according to ASTM D5427 as modified; and said yarn further provides an IV value of at least about 0.6.

In another aspect of the invention, an airbag is comprised at least in part of woven polymeric polyester yarn, said polyester yarn exhibiting superior hydrolytic resistance, said yarn being capable of being characterized by a carboxyl end group value (CEG), said yarn further being capable of being characterized by an intrinsic viscosity (IV) value, wherein said yarn provides, after said yarn is exposed for at least about 3000 hours to a temperature of at least about 85 degrees Centigrade and a relative humidity of at least about 95 percent, the following:

(a) an IV value of at least about 0.6; and
(b) a CEG value of less than about 60 equivalents/$10^6$ grams, and
(c) a tensile strength of at least about 400 lbs.

An airbag, in the practice of the invention, also may be comprised in part of woven polymeric polyester yarn, said polyester yarn exhibiting superior hydrolytic resistance. The yarn may be capable of being characterized by a carboxyl end group (CEG) value, wherein said yarn provides a CEG value of less than about 30 equivalents/$10^6$ grams after said yarn is exposed for at least about 336 hours to a temperature of at least about 85 degrees Centigrade and a relative humidity of at least about 95 percent. In some applications, the airbag cushion may further include at least one fabric blank including polyester yarn, said polyester yarn exhibiting a CEG value of less than 30 equivalents/$10^6$ grams and IV value greater than 0.6. An airbag cushion also may be employed in yet another embodiment of the invention, which has a tensile strength of the fabric which is greater than about 275 lbs, or greater than about 400 lbs. after exposure.

In yet another embodiment, the invention may provide for a woven airbag including polyester yarn exhibiting a CEG value of less than about 30 equivalents/$10^6$ grams and an IV value which is greater than about 0.6.

In one aspect of the invention, an airbag may provide a CEG value of less than about 50 equivalents/$10^6$ grams after exposure to at least about 3000 hours at a temperature of at least about 85 degrees Centigrade and a relative humidity of at least about 95 percent. In yet another embodiment, an airbag having a CEG value of less than about 40 equivalents/$10^6$ grams after exposure to at least about 3000 hours at temperature of at least about 85 degrees Centigrade and a relative humidity of at least about 95 percent has been discovered.

In yet another embodiment of the invention, an airbag may be comprised of polyester yarn retaining at least about 85% of the tensile strength of said yarn after said yarn is exposed for at least 1000 hours at a temperature of at least about 85 degrees Centigrade and a relative humidity of at least about 95 percent. An airbag of the invention also may be comprised of polyester yarn retaining at least about 85% of the tensile strength of said yarn after said yarn is exposed to at least 3000 hours at temperature of at least about 85 degrees Centigrade and a relative humidity of at least about 95 percent.

Furthermore, it has been found that the use during polyester manufacture of chemical stabilizers and end-group capping agents may be advantageous. That is, in the practice of the invention, aging resistance may be improved through the use of chemical stabilizers. Two examples of such stabilizers that can be used are carbodiimide and ketene imines. These chemicals are incorporated in the polymerization step before the polymer is spun by the yarn manufacturer.

Commercial identifiers for various yarns are provided below. PET1 & 2 as used herein in this specification refer to polyester yarn types which are currently being offered for airbag use, and thus comprise prior art polyester yarns, as previously discussed in connection with FIGS. 1–3.

"MD-21" is the term given to only one particular source of polyester yarn that can be used in the practice of the invention. The yarn "MD-21" as provided herein comprises a polyester yarn Type 560 manufactured by Hyosung Corporation of Korea, which has not, until now, been suggested or discovered for automotive airbag applications.

On the publicly available website of Hyosung, MD-21 yarn type is suggested by Hyosung for truck covers, tents, awnings and the like. This is consistent with the general industry opinion that such polyester has in the past been believed to be unsuitable for uses that require performance for long time periods at high temperature and/or high humidity conditions. Publicly available information would suggest or teach against using such yarn for airbags. Further, chemical characteristics like CEG and I.V. usually are not readily available, and have not been discovered or published, for airbag yarns, to the knowledge of the inventors. These properties have not, until the invention of this application, been recognized as being effective for characterization of polyester yarn for airbags.

Some of the potential yarns with low CEG's that are available in the industry for Geotextile applications have been identified from Kosa, but the elongation on these specimens are very found to be insufficient for to be used in a energy absorbing device like an airbag. However, other industrial yarns like Kosa type 784, 786 & 787 can be used for airbags provided the CEG values are in the desirable range per this invention. Currently such yarns are used for industrial applications like roofing, awnings, etc. Thus, a surprising discovery of this invention is that these and many other polyester yarns are available and may be applied in the practice of the invention, applied according to the practice of the invention.

The invention is not limited to polyester yarn from any particular source, and is specifically not limited to MD-21 yarn, or yarn made by any particular manufacturer. Instead, the invention is defined in part by the discovery of the chemical properties of any polyester yarn that will make such yarn suitable for airbag usage, as further set forth herein. Thus, a new manner of characterizing yarn for airbag use has been achieved, and identified.

Table 1 below compares basic information of various polyester yarn types discussed herein,.for purposes of comparison.

TABLE 1

Comparison of Properties of Polyester Yarn Types

|  | PET 1 | PET 2 | MD-21 |
| --- | --- | --- | --- |
| Manufacturer | KOSA | Honeywell | Hyosung |
| Yarn ID | Type 781 | Type 1W72 | Type 560 |
| Denier | 650 | 540 | 500 |
| No. of filaments | 140 | 140 | 96 |
| Tenacity (g/d) | 8.5 | 8.5 | 7.4 |
| Elongation at Break (%) | 16 | 17 | 24.5 |

Surprisingly beneficial CEG values and IV values and ranges, which exist after aging, have not been discovered for use in airbag applications until the invention of this application.

Measurements on the IV and CEG levels in the polyester yarn of the invention (MD-21 polyester yarn, as further described herein, as one example) were made on aged samples, and then compared to the control samples.

Figure 4:
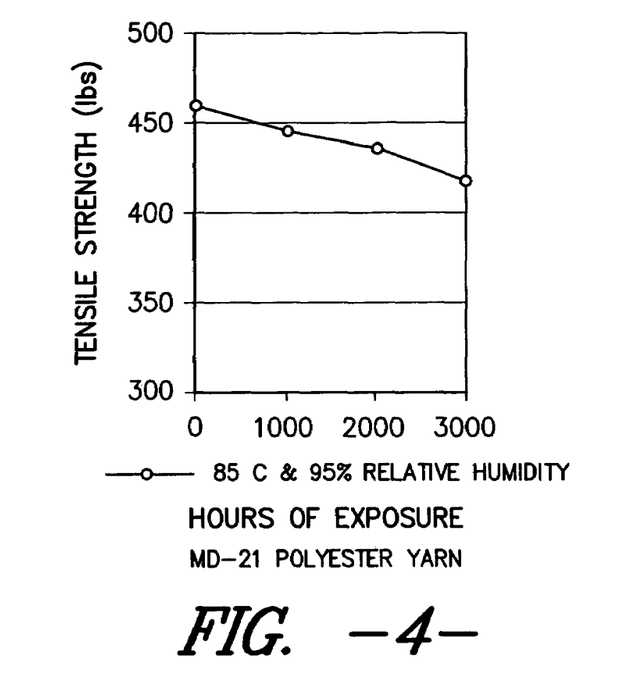
FIGS. 4–5 show results from work done with one particular polyester yarn that may be employed in the invention.
Figure 5:
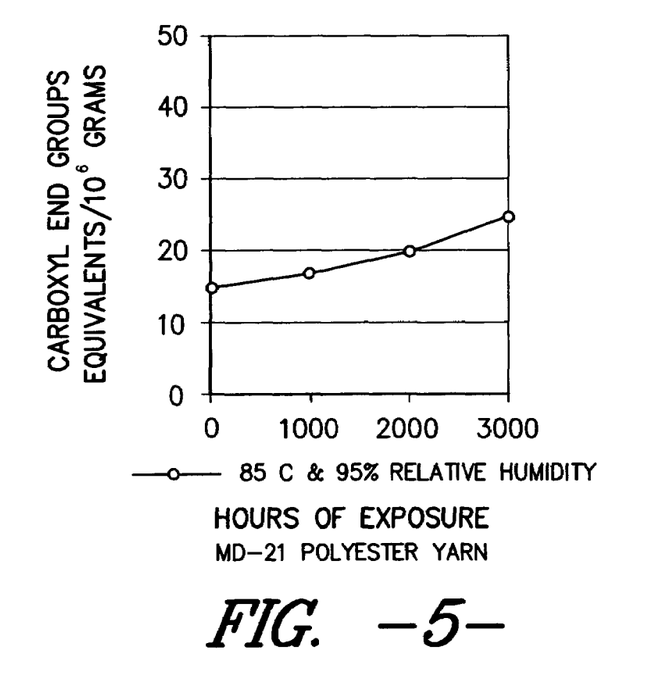
Figure 6:
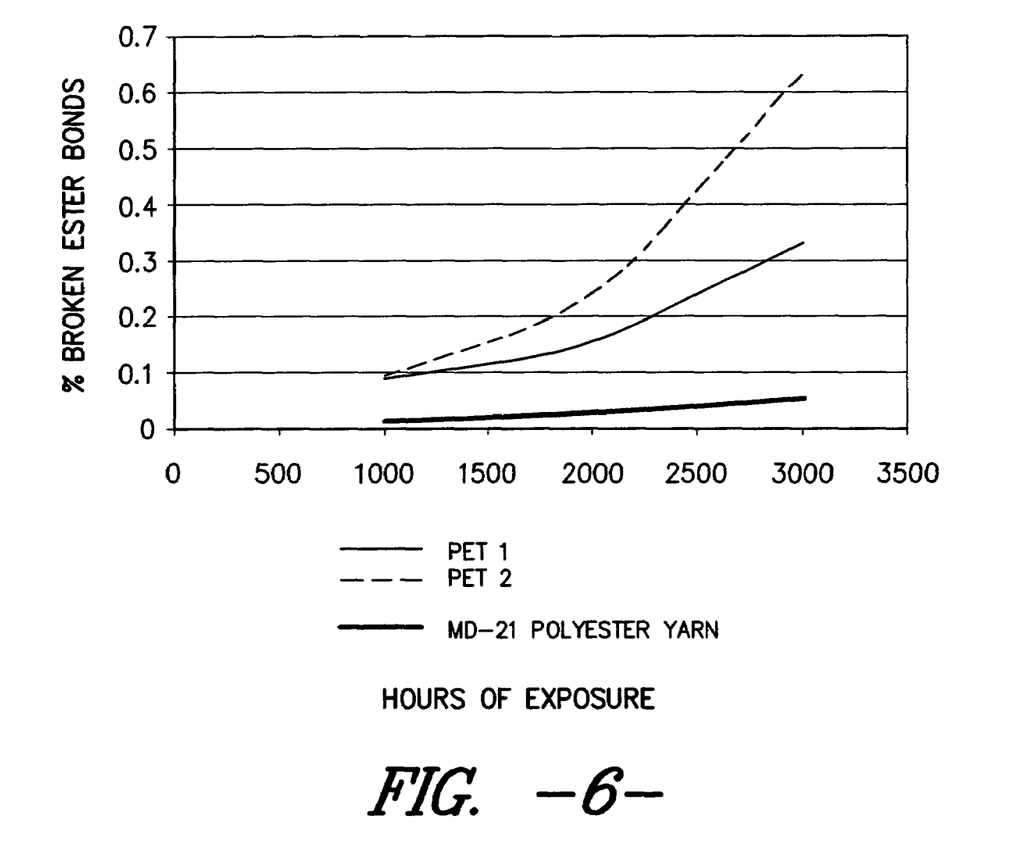
FIG. 6 reveals the percentage of broken ester bonds after hours of exposure at 80° C. and 95% RH, comparing yarns of the prior art (PET1 and PET2) with one embodiment of the yarns of the invention.

FIGS. 4–6 contain data from this work that represents the performance of one of the polyester yarns that can be employed in use of MD-21 yarn.

Airbags were made from this new fabric formed from MD-21 yarn and the performance of the fabric in the bag were evaluated. A burst pressure of 22 Psi was achieved on control airbags and 20.7 psi on the aged fabric of the invention after 3000 hrs at 85° C. & 95% RH.

In addition to modifications in properties of the starting polymer, hydrolytic resistance can be improved by adding inhibitors to the basic polymer before spinning the yarn so that polymer chain scission is minimized. Adding chemical inhibitors to improve hydrolytic resistance of PET such that CEG levels below about 60 equivalents/$10^6$ gram after aging for 3000 hrs at 85° C. & 95% RH (relative humidity) can be employed in the practice of the invention.

For purposes of this specification, heat and temperature aging exposure is provided according to the dictates of ASTM Standard D5427. That is, humidity aging as set forth in that specification is carried out in a humidity chamber at about 80 degrees Centigrade and at about 95 percent relative humidity (RH). The only significant deviation in the testing provided herein from the ASTM Standard D5427 is the length of exposure time. While the ASTM Standard D5427 calls for the specimens to remain undisturbed for 336 hours, for the current testing as set forth herein, exposure times may be longer. In the Figures, for example, exposure times of 1000, 2000, and 3000 hours are employed (See FIGS. 4–6) because such long term exposures are demanded by some automotive manufacturers. Hence, these exposure times are more in accord with automotive industry requirements.

It is also common in the airbag industry to reference the Delphi Automotive Standards for Silicone Coated Cushion Material for Use in Airbag Cushions, which also references ASTM D5427.

In the practice of the invention, it is possible to calculate the ester bonds that have broken from the main polymer backbone as a function of aging hours of exposure. The compositions of the invention show remarkable and unexpectedly superior aging properties over the prior art polyester yarns, due in part to the resistance of this polyester to aging under the conditions encountered by airbags in automotive testing.

FIGS. 4 and 5 show performance of a yarn of the invention after the aging exposure. FIG. 4 shows a tensile strength after 3000 hours of such exposure which is greater than about 400 lbs.

In the invention, it is believed that CEG values of less than 30, more preferably less than 20 are desirable for the control yarn (initial pre-aged values). Furthermore, in the invention, it is believed that CEG values in aged yarn of less than about 60 equivalents/$10^6$ grams may be desirable after 3000 hours of exposure at 85° C. and 95% RH. Thus, essentially any polyester yarn having such characteristics is believed to be a candidate for application in this invention.

Furthermore, FIG. 5 shows a CEG level using one particular embodiment of the invention (i.e. MD-21 yarn) which shows, after 3000 hours exposure, less than about 30 equivalents/$10^6$ grams, which is even more advantageous. Thus, the invention may employ levels of CEG below about 60, and more preferably, below about 30 equivalents/$10^6$ grams in CEG value after 1000 hours of exposure at 85° C. and 95% RH.

FIG. 6 shows a comparison of the total percentage of ester bonds broken for the prior art polyester compositions, over time, as compared to the total amount of ester bonds broken over time in one embodiment of the invention. In FIG. 6, it can be seen that after 3000 hours, a number for percentage of broken ester bonds below about 0.3, and more preferably below about 0.1, is possible in the practice of the invention.

The data in FIG. 6 reveal the calculated percentage of ester bonds that are broken on the polymer structure at various points in time, which are calculated as further set forth below.

Laboratory Procedure for Determining Total Acid Value (CEG)

The procedure for determining the total acid value, namely the CEG, is ISO Standard 2114:2000 (E), Method B This International Standard is used for plastics and polyester resins for determining the partial acid value (Method A) and total acid value (Method B) of polyester resins and binders. It is not applicable to phenolic resins.

In the practice of the invention, and for purposes of this specification, Method B was used. As provided in sections 8.2.1 and 4.3 of this Standard, the amount in milligrams of KOH used to neutralize 1 gram of resin was calculated. Then, the milligrams of KOH per gram were converted to microequivalents per gram of polymer, indicated as equivalents/$10^6$ grams. The test results from this method was also verified in accordance with ASTM D664 and ASTM D4094 for CEG measurements.

Laboratory Procedure for Determining Instrinsic Viscosity (IV)

The time required for the specified volume of the polymer (solution) to pass through the capillary tube of the viscometer was used to calculate the intrinsic viscosity, according to laboratory procedures, as described below.

First, a sample of about 0.1 grams of a given polyester fiber material was dissolved in a solution. The solution is a 60/40 mixture (by weight) of phenol and 1,1,2,3 tetrachloroethane, to a concentration of 0.4 gm/100 ml respectively.

The solution thus made as above is applied in a viscometer, such as for example a Ubbelohde viscometer. The solution was poured into the viscometer and maintained at 30° C. on a water bath for at least 10 minutes and the flow time of the solution was recorded as $t_1$.

Then, the solution above described (control) without the dissolved yarn (i.e., solvent) is measured in the same manner, upon the same viscometer, under the same conditions. This measurement is $t_2$, and serves as a standard or control.

The Relative Viscosity (RV) then is determined, by dividing the time, $t_1$ by time, $t_2$. The RV then is converted to Intrinsic viscosity, IV, by way of the following equation:

$$I.V = \frac{1}{4}(RV-1)/C + \frac{3}{4}\ln\left(\frac{RV}{C}\right)$$

Where, RV is the relative viscosity; IV is the intrinsic viscosity and C is the concentration of the solution in gm/100 ml.

Determining % Broken Ester Bonds in the Backbone

Percent broken ester bonds (% BEB) is a ratio of the scission of ester bonds by hydrolysis to the total ester bonds on the control. This parameter was calculated from the I.V. measurements as described earlier with the specific solvent used for the test as follows:

$$\% BEB = 0.244\left[(I.V_{final})^{-1.471} - (I.V_{Control})^{-1.471}\right]$$

Observations

From the above analysis it is clear that the polyester yarn degradation can be monitored by changes in IV and CEG. For the first time, the work of this specification has enabled correlation between CEG, IV, and yarn performance after aging, which is identified specifically for airbag uses.

Lower CEG levels in the control polymer/ yarn lower the extent of degradation. The IV of the yarn advantageously may be about 0.6. Further, it has been found that CEG levels in the control polyester yarn which are below about 30, or more preferably below about 20 equivalent/$10^6$ grams, improve aging behavior.

Polyester yarns having an IV of at least about 0.6, or alternately at least about 0.7, and also between about 0.5 and 0.8 are particularly useful. Furthermore, a polyester yarn exhibiting at least about 400 lbs of tensile strength after exposure to 3000 hours of temperature/humidity testing is featured in a further aspect of the invention.

Polyester yarns having a CEG of less than about 30 equivalents/$10^6$ grams have been shown to be capable of passing automotive testing requirements. It has been discovered that a CEG value of less than about 30 equivalents/$10^6$ grams correlates well with values of IV of between 0.5 and 0.8, and such a polyester yarn is capable of superior aging characteristics.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

The invention claimed is:

1. An airbag comprised in part of woven polymeric polyester yarn, said polyester yarn exhibiting superior hydrolytic resistance, said yarn being characterized by a carboxyl end group (CEG) value, wherein said yarn provides a CEG value of less than about 30 equivalents/$10^6$ grams after said yarn is exposed for at least about 336 hours to a temperature of at least about 85 degrees Centigrade and a relative humidity of at least about 95 percent, wherein said fabric provides a tensile strength of at least about 400 lbs after said exposure.

2. The airbag of claim 1 wherein said yarn further exhibits an IV value of at least about 0.6.

3. The airbag of claim 1 wherein said yarn further exhibits an IV value of at least about 0.7.

4. The airbag of claim 1 wherein said yarn further exhibits an IV value of between about 0.5 and about 0.8.

5. The airbag of claim 1 wherein the calculated percentage of broken ester bonds in said yarn after said exposure is less than about 0.3 percent.

6. The airbag of claim 1 wherein the calculated percentage of broken ester bonds in said yarn after said exposure is less than about 0.1 percent.

7. The airbag of claim 1 wherein said yarn further comprises chemical inhibitors or end group capping agents which serve to improve the overall hydrolytic resistance of said polyester yarn.

8. An airbag cushion, said airbag cushion made from a woven fabric comprising polyester yarn, said polyester yarn having a CEG value of less than about 60 equivalents/$10^6$ grams after said yarn is exposed for at least about 3000 hours to a temperature of at least about 85 degrees Centigrade and a relative humidity of at least about 95 percent, and said woven fabric having a tensile strength of at least about 400 lbs after said exposure.

9. The airbag cushion of claim 8 wherein said yarn further exhibits an IV value of at least about 0.6.

10. The airbag cushion of claim 8 wherein said yarn further exhibits an IV value of at least 0.7.

11. The airbag cushion of claim 8 wherein said yarn further exhibits an IV value of between about 0.5 and about 0.8.

12. The airbag cushion of claim 8 wherein said yarn provides a tensile strength of at least about 400 lbs when tested in accordance with ASTM standard D5034 after said exposure.

13. The airbag cushion of claim 8 wherein the calculated percentage of broken ester bonds in said yarn after said exposure is less than about 0.3 percent.

14. The airbag cushion of claim 8 wherein the calculated percentage of broken ester bonds in said yarn after said exposure is less than about 0.1 percent.

15. The airbag cushion of claim 8 wherein said polyester yarn further comprises chemical inhibitors or end group capping agents which serve to improve the hydrolytic resistance of said polyester yarn.

16. An airbag comprised at least in part of woven polymeric polyester yarn forming a fabric, said polyester yarn exhibiting superior hydrolytic resistance, said yarn being characterized by a carboxyl end group value (CEG), said yarn further being characterized by an intrinsic viscosity (IV) value, wherein said yarn provides, after said yarn is exposed for at least 3000 hours to a temperature of at least about 85 degrees Centigrade and a relative humidity of at least about 95 percent, the following:
  (a) an IV value of at least about 0.6; and
  (b) a CEG value of less than about 60 equivalents/$10^6$ grams, and
  (c) a the fabric has a tensile strength of at least about 400 lbs after said exposure.

17. An airbag comprised in part of woven polymeric polyester yarn, said woven polymeric polyester yarn forming a fabric, said polyester yarn exhibiting superior hydrolytic resistance, said yarn being characterized by a carboxyl end group (CEG) value, wherein said yarn provides a CEG value of less than about 30 equivalents/$10^6$ grams after said yarn is exposed for at least about 336 hours to a temperature of at least about 85 degrees Centigrade and a relative humidity of at least about 95 percent, and further wherein said fabric after said exposure provides a tensile strength of at least about 400 lbs.

18. An airbag cushion comprising:
  at least one fabric portion including polyester yarn, said polyester yarn exhibiting a CEG value of less than about 30 equivalents/$10^6$ grams and IV value greater than 0.6, wherein the fabric portion has a tensile strength of greater than about 400 lbs after exposure for at least bout 336 hours to a temperature of at least about 85 degrees Centigrade and a relative of at least about 95 percent.

19. A woven airbag made of woven fabric comprising polyester yarn, said polyester yarn exhibiting a CEG value of less than about 30 equivalents/$10^6$ grams and an IV value greater than about 0.6, wherein the woven fabric has a tensile strength of greater than about 400 lbs after exposure for at least about 336 hours to a temperature of at least about 85 degrees Centigrade and a relative humidity of at least about 95 percent.

20. The airbag of claim 19 wherein said CEG value is less than about 50 equivalents/$10^6$ grams after exposure to at least about 3000 hours at a temperature of at least about 85 degrees Centigrade and a relative humidity of at least about 95 percent.

21. The airbag claim 19 wherein said CEG value is less than about 40 after exposure to at least 3000 hours at a temperature of at least about 85 degrees Centigrade and a relative humidity of at least about 95 percent.

22. An airbag comprising fabric comprised of polyester yarn, said polyester yarn retaining at least about 85% of the tensile strength of said yarn after said yarn is exposed for at least 1000 hours at a temperature of at least about 85 degrees Centigrade and a relative humidity of at least about 95 percent, said yarn having a CEG value of less than about 60 equivalents/$10^6$ grams and said fabric has a tensile strength of at least about 400 lbs after said exposure.

23. An airbag comprising a fabric comprised of polyester yarn, said polyester yarn retaining at least about 85% of the tensile strength of said yarn after said yarn is exposed to at least about 3000 hours at a temperature of at least about 85 degrees Centigrade and a relative humidity of at least about 95 percent, said yarn having a CEG value of less than about 60 equivalents/$10^6$ grams and said fabric has a tensile strength of at least about 400 lbs after said exposure.

* * * * *

UNITED STATES PATENT AND TRADEMARK OFFICE
CERTIFICATE OF CORRECTION

PATENT NO. : 7,014,914 B2
APPLICATION NO. : 10/755121
DATED : March 21, 2006
INVENTOR(S) : Ramesh Keshavaraj It is certified that error appears in the above-identified patent and that said Letters Patent is hereby corrected as shown below:

Column 11,
Line 32, delete "bout" and insert -- about --.
Line 33, after "relative" insert -- humidity --.

Signed and Sealed this

Twentieth Day of June, 2006

JON W. DUDAS
*Director of the United States Patent and Trademark Office*